April 30, 1946.   K. JANISZEWSKI   2,399,188
DIE SET AND METHOD OF MANUFACTURE THEREOF
Filed April 29, 1943

INVENTOR
KASIMIR JANISZEWSKI
BY
Wheeler, Wheeler & Wheeler
ATTORNEYS.

Patented Apr. 30, 1946

2,399,188

UNITED STATES PATENT OFFICE 2,399,188

DIE SET AND METHOD OF MANUFACTURE THEREOF

Kasimir Janiszewski, Milwaukee, Wis.

Original application December 23, 1940, Serial No. 371,252. Divided and this application April 29, 1943, Serial No. 485,032

4 Claims. (Cl. 164—118)

This invention relates to improvements in die sets and methods of manufacture thereof. The present application is a division of my application Serial No. 371,252, filed December 23, 1940, and entitled Die set assemblies.

It is the primary object of the present invention to provide for the production of a novel and simple die set susceptible of economical manufacture to save time, labor and money and to provide increased plate area in relation to the amount of metal employed.

More specifically stated, it is an object of the present invention to provide a die set by welding the leader pins and bushings to their respective plates in positions determined by a suitable jig or fixture which positions the parts with respect to the plates without requiring any accurate machining on either, the bushings and pins being simply located as required by the fixture and held in the required relationship by the weld.

Other objects of the invention will be apparent to those skilled in the art upon analysis of the following disclosure thereof.

In the drawing.

Like parts are identified by the same reference characters throughout the several views.

Figure 1:
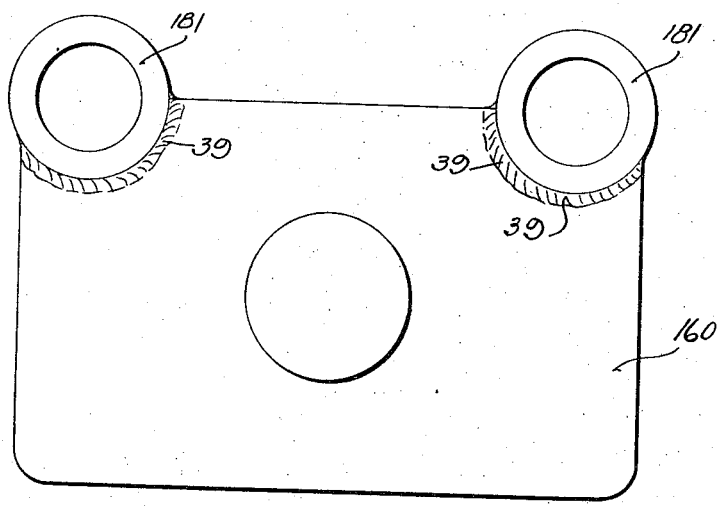
Fig. 1 is a plan view of a die set embodying the invention.

The press plate 160 and the bed plate 150, instead of being large enough to receive such guide elements as pins and bushings with a driven fit, as is customary, are reduced in size and may have material removed at the corners to provide recesses in which the bushings 181 are secured by welds 39 to the plate 160, the leader pins 171 being similarly welded to the platen 150.

Figure 2:
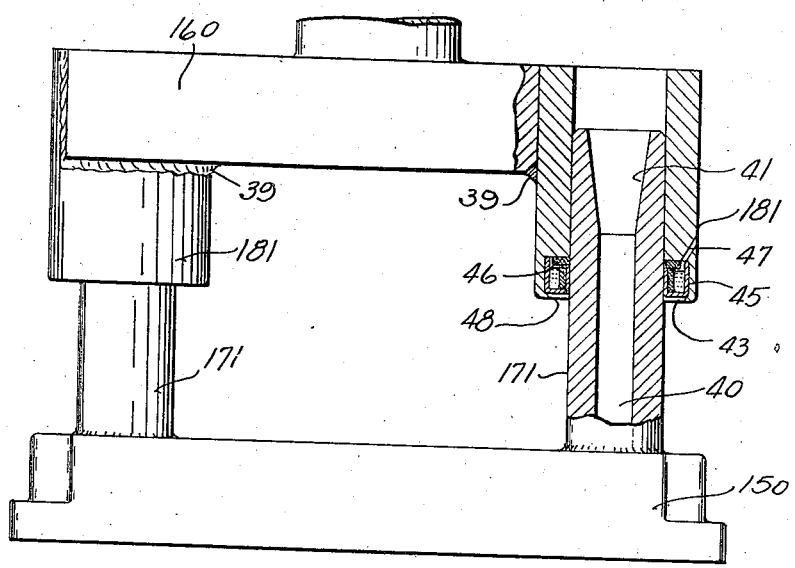
Fig. 2 is a view partially in side elevation and partially in transverse section of the device shown in Fig. 1.

To accomplish welding, the leader pins and their respective bushings are assembled upon a suitable jig or fixture which holds them in proper axial alignment in the respective pairs and at right angles to the respective plates while the welding operation is performed. To accommodate such a jig or fixture the leader pins 171 may be tubular, having a hollow interior bore 40 and preferably being provided with a counterbore at 41 as shown in Fig. 2. The tapering counterbore 41 is adapted to receive a complementary form of jig for maintaining the parts in the specified relation. Since the bushing and leader pin are positioned by a jig or fixture and do not require a driven fit in connection with any hole in the plates 150 or 160, it is unnecessary to surface accurately the outside portions of the guide elements which are engaged with their respective plates. The welding operation, therefore, saves considerable labor in this regard, and the bushings and leader pins may simply be fixed in the desired relationship to each other and the respective plates by the fitting and the plates are then built up by the weld to embrace the contiguous portions of the bushings and leader pins to integrate the respective structures.

That portion of the leader pin within which the jig or fixture engages should, however, be accurately finished co-axially with the bearing surfaces of the leader pin and bushing.

In this low cost construction the leader pins and bushings would not ordinarily be hardened, and it is therefore convenient to provide for lubrication by providing a counterbored recess at 43 in the lower end of each bushing and inserting into the recess an annular channel 45, the outer peripheral wall of which has a pressed fit in the counterbore 43 and the inner peripheral wall of which is made to correspond in diameter to the interior bore of the bushing. The inner wall also serves as a retainer for the wick system 46 which bears against the leader pin and dips into the annular reservoir to pick up lubricant which may be introduced into the reservoir through the filling opening 47 in the bushing.

While a pressed fit is ordinarily adequate to retain the annular reservoir in the counterbore of the bushing, the end of the bushing may be upset at 48 if desired, so as to fix the reservoir permanently in place.

The lubrication system is not claimed herein, having been disclosed and claimed in the parent application above identified.

Since the guide elements comprising the leader pins 171 and the bushings 181 are so located as to be outside of the area of the respective plates to which they are to be secured, the area of each plate exposed to receive a die is relatively large in proportion to the amount of metal used in the plate. In addition, it is advantageous in the design of certain jigs and fixtures to have peripheral surface portions of the guide elements exposed beyond the plate and to leave such surface portions exposed during the welding operation, the welding being limited to only a part of the periphery of each guide element.

I claim:

1. The method of making a die set, which comprises the positioning of a plate and guide elements normal thereto, and the welding of the guide elements to the plate while so positioned, the positioning being effected by means external to the plate and the guide elements whereby to be independent of machining.

2. The method of making a die set which comprises the positioning of a guide element at least partially outside of the area of a plate, the maintenance of the specified position of the element respecting the plate by means independent of any machine surface of the plate, and the welding of the guide element to the plate in the position so fixed.

3. The method of making a die set which comprises notching a marginal portion of a plate, positioning a guide element in the notch of the plate independently of support from the plate, and welding the guide element to the plate while so positioned.

4. In a die set, the combination with a bed plate and a press plate each having marginal corner recesses, of leader pins side-welded to the bed plate in said corner recesses and supported by their welded connections perpendicular to the working surface of the bed plate with outer portions of the pins beyond the bed plate, cylindrical guide tubes having like connection in the corner recesses of the press plate and held in position to telescopically receive the leader pins, with the outer portions of said guide tubes overhanging open space beyond the leader pins and bed plate.

KASIMIR JANISZEWSKI.